INVENTOR,
CARROL D. HOOPER

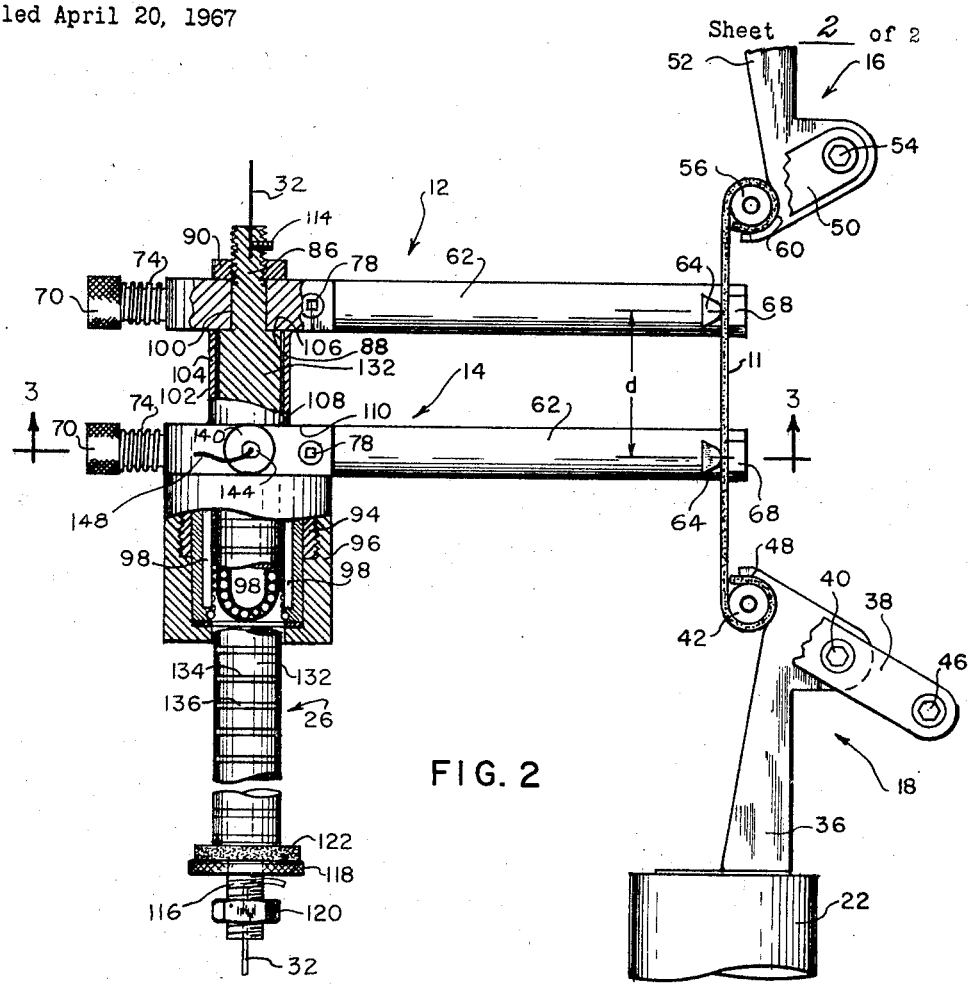

[United States Patent Office patent document]

3,425,131
EXTENSOMETER
Carrol D. Hooper, Decatur, Ala., assignor to the United States of America as represented by the Administrator of the National Aeronautics and Space Administration
Filed Apr. 20, 1967, Ser. No. 634,040
U.S. Cl. 33—147                3 Claims
Int. Cl. G01b 5/30

ABSTRACT OF THE DISCLOSURE

An apparatus for measuring successive increments of strain of an elastomer having a first self releasing specimen grip mounted to a counter-balanced freely hanging calibrated shaft and having a second self releasing specimen grip slidably mounted to the calibrated shaft and carrying a sensing device which cooperates with the calibrated shaft to provide an electrical signal on successive increments of strain.

Background of the invention

The invention described herein may be manufactured and used by or for the Government of the United States of America for governmental purposes without the payment of any royalties thereon or therefor.

This invention relates to testing equipment and in particular to instrumentation for measurement of the strain or elongation of an elastomer.

In the testing of elastomers a specimen is secured in clamps between the crossheads of a testing machine and elongated by causing one crosshead to move relative to the other. Ordinarily, bench marks are placed on the specimen a given distance apart and strain is defined as the extension between the bench marks on the specimen produced by the tension force and is expressed as a percentage of the original distance between the marks.

One of the previous methods of measuring the elastomer elongation or strain is termed the hand rule technique and consists of simply measuring the change in length of the test specimen between the bench marks placed on the specimen by visually following these marks with either a standard scale or a thin graduated film that is bonded to one of the bench marks on the specimen. As would be expected, the accuracy obtained depends upon the experience of the operator, and inaccuracy due to fatique of the operator can occur after a relatively short period of time. The difficulties encountered with the visual methods of measuring the strain rate of an elastomer has resulted in an investigation being made into the possibilities of designing an instrument to automatically measure the strain of the specimen and to provide a signal for apparatus to automatically record the same.

Summary

According to the present invention it has been found that an extensometer can be made which has none of the aforementioned shortcomings by employing upper and lower grips that grip the specimen at the bench marks and follow the strain of the elastomer. The use of grips attached directly to the specimen is made possible by the novel technique of anchoring the upper grip to a freely hanging counter-balanced calibrated shaft while slidably mounting the lower grip to the shaft. This technique coupled with the unique use of a sensing device carried by the lower grip permits the specimen to be elongated to the breaking point without interference between the extensometer and the test specimen.

Accordingly, one object of the present invention is to provide an extensometer that automatically signals successive increments of strain of an elastomer.

Another object is to provide an extensometer which permits measurement of strain without interference between the extensometer and the test specimen.

Brief description of the drawings

These and other objects and advantages will be more apparent upon reference to the following, specification, appended claims and drawing wherein:

FIGURE 2 is a front elevation of the extensometer partially broken away to condense the figure and partially in section for showing details of construction of the specimen grips and the calibrated shaft.

FIGURE 3 is a sectional view taken along line 3—3 of FIGURE 2 showing details of construction of the lower specimen grip.

Description of the preferred embodiment

Figure 1:
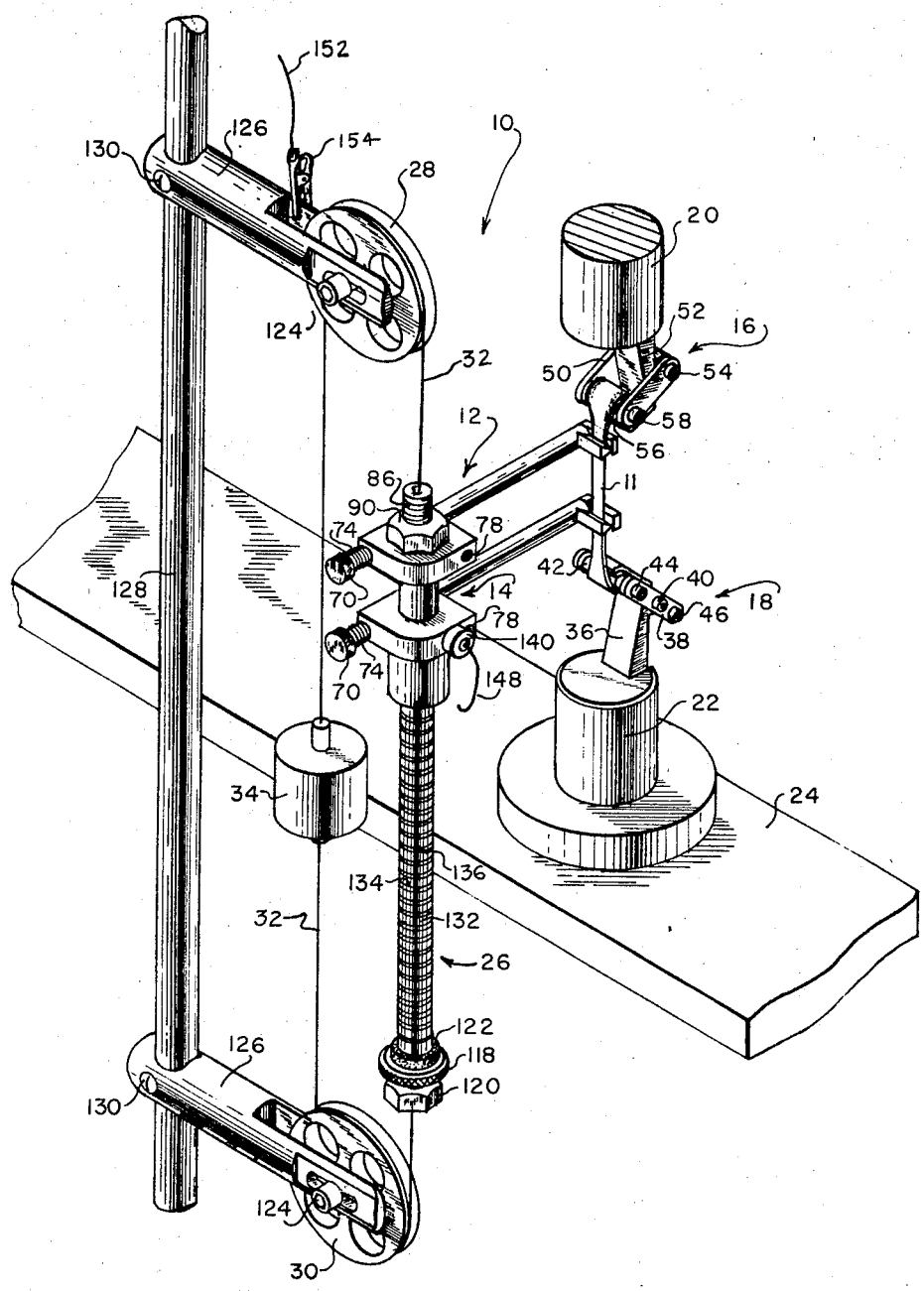
FIGURE 1 is an isometric view of an extensometer constructed in accordance with this invention mounted on a specimen.

With continued reference to the accompanying figures where like numerals designate similar parts throughout the various views and with initial attention directed to FIGURE 1, reference numeral 10 designates an extensometer constructed in accordance with the present invention. As can be seen the extensometer includes an upper and a lower specimen grip 12 and 14 for gripping a specimen 11 of an elastomer, which is held between a pair of stress transmitting clamps 16 and 18, respectively connected to rods 20 and 22. The rod 20 is connected to the fixed crosshead of the testing machine (not shown) and the rod 22 is connected to the movable crosshead 24 of the testing machine. For the purpose of providing a signal of successive increments of strain of the specimen 11 the invention contemplates a calibrated shaft 26 freely supported on pulleys 28 and 30 by wire 32 and counterbalanced by weight 34. The shaft 26 is anchored to the upper specimen grip 12 while the lower grip is slidably mounted to the shaft so that when the movable crosshead 24 is moved downwardly boh the upper grip 12 and the shaft 26 will be moved downwardly by the elongation of the specimen causing a clockwise rotation of the pulleys, while at the same time, the grips 12 and 14 are moved apart by the elongation of the portion of the specimen between the grips. In a manner to be more fully described hereinafter the lower grip 14 cooperates with the calibrated shaft to provide an electrical signal indicating successive increments of strain.

As previously indicated the specimen 11 is connected between a pair of stress transmitting clamps 16 and 18 of a testing machine. The clamps are of standard construction and as shown in FIGURES 1 and 2 the clamp 18 includes a portion 36 formed at the end of rod 22 which carries a yoke shaped element 38 rotatably mounted as indicated at 40. The yoke shaped element includes a serrated roller 42 secured thereto by set screws 44 and a counterbalance bar 46 so that the roller is normally resting against a clamp surface 48 (FIGURE 2) of the portion 36. Clamp 12 is similarly constructed and includes a yoke shaped element 50 rotatably mounted to the portion 52 of rod 20 as indicated at 54. A serrated roller 56 is affixed to element 50 by means of set screw 58 and normally rests against the clamp surface 60 as shown in FIGURE 2.

In operation the ends of the test specimen 11 are placed between the serrated rollers 42 and 56 and the respective clamp surfaces 48 and 60 and when the movable crosshead 24 is moved downwardly a wedging action takes place so that the ends of the specimen are firmly held. As the clamps are moved apart, the center portion of the specimen is elongated and for the purpose of sensing this elongation or strain, the invention includes upper and lower specimen grips 12 and 14 which are adapted to be fixedly secured to the specimen in a manner to be movable therewith.

The structural details of the upper and lower grips are shown in FIGURES 2 and 3. The grips 12 and 14 both includes a sleeve 62 having a generally triangular shaped jaw 64 formed at one end thereof. As shown in the sectional view of grip 14 in FIGURE 3 a rod 66 is rotatably and slidably contained within the sleeve 62, of the grips and includes jaw 68 formed at the end adjacent to jaw 64. The movement of the rod 66 within the sleeve is controlled by nut 70, disposed on threaded position 72 of the rod, and spring 74 which bears between the nut and the sleeve. Also as seen in FIGURE 3 the grips include a threaded aperture 76 having an adjusting set screw 78 disposed therein. Spring 80 bears between the nut and ball bearing 82 and the ball bearing bears against a slotted surface 84 formed in the rod 66.

In operation the specimen 11 is inserted between the jaws 64 and 68 of grips 12 and 14 and the clamping force is augmented by the rotation of nut 70 which urges jaw 68 toward 64. Relative rotation between the jaws is inhibited by rotation of set screw 78 which causes ball bearing 82 to apply a force against the slotted surface 84 of rod 66. In a manner to be more fully explained hereinafter the forces applied by nut 70 and nut 78 to the rod 66 of grips 12 and 14 are controlled so that when the specimen is strained to breakage the specimen will apply sufficient force to jaws 68 to rotate them away from jaws 64 so as to release the broken specimen from the grips.

The manner in which the grips 12 and 14 are attached to shaft 26 so as to allow the grips to follow the strain of the specimen 11 is explained following. As shown, in section, in FIGURE 2 the upper portion of the shaft 26 has a reduced partially threaded portion 86 extending therefrom forming a supporting shoulder 88 on the shaft. The reduced portion 86 is adapted to be inserted through an aperture 100 in the grip 12, which aperture has an enlarged portion 102 forming a spacing extension 104 and shoulder 106. In operation nut 90 disposed on the threaded portion is rotated to force shoulders 88 and 106 into abutting relationship so as to hold grip 12 in a fixed position on shaft 26.

So as to allow relative movement between grip 12 and grip 14 an aperture 92 (FIGURE 3) formed in grip 14 is adapted to slidably receive shaft 26. As shown partially in section in FIGURE 2 grip 14 is provided with a threaded extension 94 for engaging a bearing housing 96. Shaft 26, shown partially broken away to disclose details of construction of the bearing housing 96, extends through the bearing housing and abuts re-circulating bearings 98 inserted in the housing 96, which bearings allow grip 14 to slide relative to the shaft with essentially no friction.

As previously indicated, in the strain testing of elastomers, strain is defined as the extension between bench marks on a specimen produced by a tension force applied to a specimen and is expressed as a percentage of the original distance between the marks. Ordinarily, bench marks on the specimen are placed one inch apart and this distance is often called the gauge length. One of the advantages of the present invention is that the specimen grips are arranged so that they automatically provide for correct gauge length.

The automatic gauge length is brought about as follows. The upper grip 12 point of clamping, i.e., the line contact made by jaws 64 and 68, is arranged a known distance from the surface 108 on the spacing extension 104 of grip 12. Likewise, the point of clamping of the lower grip 14 is arranged a known distance from the surface 110 on the grip 14. The surfaces are machined so that whenever they are in abutting relationship as shown in FIGURE 2, the points of contact on each grip are separated by a known distance. This is the gauge length and is represented by the letter $d$ in FIGURE 2.

The manner in which the shaft 26 is supported so as to allow grips 12 and 14 to follow the strain of the specimen is explained following. As shown in FIGURE 2, wire 32 consisting of an electrically conductive material is inserted into an aperture formed in the reduced portion 86 of shaft 26 and clamped by means of set screw 114. The opposed end of the shaft has a reduced threaded stem 116 on which is disposed nut 118 and nut 120. Wire 32 is inserted into an aperture formed in the stem 116 and clamped in place by rotation of the nut 120. Additionally, as shown in FIGURE 2 nut 118 supports foam rubber 122 which cushions the fall of grip 14 when it is released from the specimen.

As shown in FIGURE 1 wire 32, which is attached to opposite ends of the shaft 26, is supported by two V-grooved stainless steel pulleys 28 and 30 and is affixed to a counter-balance weight 34. Adjusting nuts 124 position the pulleys within the slotted portion of the pulley guides 126 and the guides are slidably received by a mounted rod 128 and affixed in position by means of recessed set screws 130.

It will be observed that when the movable crossbar 24 is moved downwardly both the grip 12 and the shaft 26 will be moved downwardly by the elongation of the specimen causing a clockwise rotation of the pulleys. However the grip 12, wire 26 and the counter-balance weight are so arranged that the effective mass on either side of the pulley remains the same. In this manner, the weight of the grip 12 and shaft 26 is substantially counteracted or balanced out so as to keep at a minimum the loads or stresses imposed on the specimen other than that imposed by the movable crosshead.

It will be further observed that the strain of the specimen will also cause grip 14, which is slidably received on shaft 26, to move downwardly in accordance with the strain of the specimen between grips 12 and grip 14. The manner in which the present invention senses this strain and automatically provides a signal indicative of successive increment is explained following.

As shown in FIGURE 2 the shaft 26 in the present embodiment consists of a stainless steel rod 132 that has been pre-grooved into equal increments with the grooved portions typically identified by reference numeral 134. The grooved portions are potted with a non-conductive resin 136 and the shaft 26 is preferably machined to a mirror finish to eliminate any friction drag with grip 14. As shown in FIGURE 3 grip 14 is provided with an electrical contact generally shown at 138 for alternately engaging the non-conductive resin 136 and the conductive rod 132 of shaft 26. The electrical contact includes nut 140 disposed on a threaded aperture 142 formed in the grip 14. Disposed within the nut 140 in an embedding material 144 is an electrically conductive spring 146 connected to a lead wire 148 on one end and abutting a steel sphere 150 on the opposed end for urging the sphere into contact with the shaft 26. A second lead wire 152 may be conveniently connected to pulley guide 126 by clip 154 for completing an electrical circuit which includes pulley 28, stainless steel wire 32, rod 132, contact 138 and lead wire 148. In operation, as grip 14 moves relative to the shaft 26, contact 138 will alternately close and open this circuit as the steel sphere alternately makes contact with the conductive rod 132 and the non-conductive resin 134. Leads 148 and 152 may be conveniently connected to a recorder to produce a signal when the circuit is completed, which signal may suitably be a jog-and-return movement in the X direction of the needle on a chart recording load time as X–Y, thereby recording time after which and load under which successive increments of strain occur.

If the test is continued to specimen breakage, grips 12 and 14 could be subjected to possible injury if allowed to remain attached to the specimen. As previously explained however grips 12 and 14 are both provided with spring biased nuts 70 and spring biased set screws 78 to control the amount of force necessary to grip the specimen. In operation the nuts 72 and set screws 78 are adjusted so that on specimen breakage the quick contraction of the specimen will exert sufficinet force to rotate jaws 68 away from jaws 64. Upon release grip 14 will fall to the foam rubber cushion 122, which absorbs the shock from the grip 14, while grip 12 upon release will remain in a free position due to counter-balance weight 34.

Thus, the present invention provides unique apparatus for automatically signalling successive increments of strain of an elastomer, which apparatus may be used with a minimum amount of experience and which results in reproducible tests from laboratory to laboratory since the strain rate is followed by an automatic process. While a particular embodiment of the present invention has been shown and described, it will be obvious in the art that changes and modifications may be made without departing from this invention in its broader aspects.

What is claimed is:
1. An extensometer comprising:
a shaft member comprising an electrically conductive longitudinally extending rod having equally spaced grooved portions circumferentially extending on said rod and having a nonconducting material embedded in said grooved portion;
first gripping means anchored to said shaft for gripping a specimen to define a first bench mark;
second gripping means for gripping said specimen at a second bench mark spaced from said first bench mark, said second gripping means slidably mounted to said shaft for movement relative to said first gripping means in accordance with the strain of the specimen between said first and second bench marks;
electrical contact means carried by said second gripping means for alternating engaging said electrically conductive rod and said electrically non-conductive material of said shaft in accordance with the movement of said second gripping means relative to said first gripping means; and
support means connected to said shaft member including an electrically conductive wire connected to opposite ends of said shaft, said shaft and said wire arranged in a continuous loop, and a first and a second pulley engaging said wire for rotatably supporting said shaft and further including weight means affixed to said wire for counteracting the weight of said shaft and said first gripping means.

2. An extensometer of claim 1 wherein said first and second gripping means include respectively a sleeve portion having a first jaw disposed at one end thereof for engaging one side of said specimen, a rod rotatably and slidably disposed within said sleeve portion, said rod having a second jaw disposed adjacent to said first jaw for engaging the opposite side of said specimen and said rod having a threaded portion on the opposed end from said second jaw, said threaded portion extending outwardly from said sleeve, a spring biased nut engaging said threaded portion for urging said second jaw toward said first jaw and means associated with said rod for inhibiting rotational movement of said rod relative to said sleeve until specimen breakage occurs.

3. An extensometer of claim 2 wherein said last named means includes a slotted surface disposed on said rod and a spring biased ball bearing carried by said sleeve for engaging said slotted surface.

References Cited

UNITED STATES PATENTS

| 604,688 | 5/1898 | Moore | 29—597 |
| 919,140 | 4/1909 | Duncan | 73—95 |
| 1,679,751 | 8/1928 | Stevenson | 73—98 |
| 2,833,045 | 5/1958 | Strimel. | |
| 3,178,827 | 4/1965 | De Nicola. | |
| 3,295,365 | 1/1967 | Larrigan et al. | |

SAMUEL S. MATTHEWS, *Primary Examiner.*

U.S. CL. X.R.

73—95